US005537678A

United States Patent [19]

King et al.

[11] Patent Number: 5,537,678

[45] Date of Patent: Jul. 16, 1996

[54] SELECTIVE CALL RECEIVER HOLSTER WITH INTEGRAL DISPLAY IMPACT PROTECTION

[75] Inventors: Jeffrey S. King; Jorge N. Castilla, both of Boynton Beach; Randall S. Pennington, Palm City, all of Fla.

[73] Assignee: Motorola, Inc., Schaumburg, Ill.

[21] Appl. No.: 376,478

[22] Filed: Jan. 20, 1995

Related U.S. Application Data

[63] Continuation of Ser. No. 42,433, Apr. 5, 1993, abandoned.

[51] Int. Cl.[6] .............. H04B 1/08; H04Q 7/00; B65D 25/10

[52] U.S. Cl. .............. 455/348; 455/351; 340/825.44; 224/930; 224/242

[58] Field of Search .............. 340/825.44; 224/197, 224/224, 225, 226, 232, 245, 249, 252, 253, 903, 912, 152, 269, 929, 930; 361/814; 455/344, 348, 351; D3/218; 345/169; 364/708.1, 705.01, 705.02, 705.05; 312/208.4

[56] References Cited

U.S. PATENT DOCUMENTS

| | | | |
|---|---|---|---|
| D. 354,620 | 1/1995 | King et al. | D3/218 |
| 594,188 | 11/1897 | Amez-Droz | 224/269 |
| 1,027,574 | 5/1912 | Sublett | 224/269 |
| 4,479,596 | 10/1984 | Swanson | D3/218 |
| 4,485,946 | 12/1984 | Liautaud et al. | 224/242 |
| 4,518,961 | 5/1985 | Davis et al. . | |
| 4,858,798 | 8/1989 | Siddoway et al. | 224/245 |
| 4,860,005 | 8/1989 | DeLuca et al. | 340/825.44 |
| 4,896,805 | 1/1990 | Klaczak et al. | 224/253 |
| 4,956,895 | 9/1990 | Hayasaka | 224/252 |
| 5,105,335 | 4/1992 | Houda | 361/814 |
| 5,255,835 | 10/1993 | Burks | 224/224 |
| 5,307,520 | 4/1994 | Oyamada et al. | 455/351 |

OTHER PUBLICATIONS

Texas Instruments; EduCALC Catalog #58, p. 37, Pricing Effective Nov. 22, 1992.

Ericsson Alpha Products, Copyright 1990 Ericisson Radio Systems BV, 5 pages.

*Primary Examiner*—Alyssa H. Bowler
*Assistant Examiner*—Mark H. Rinehart
*Attorney, Agent, or Firm*—D. Andrew Floam

[57] ABSTRACT

A holster (201) serves to protect an information display (202) in a selective call receiver (200) from breakage due to an impact in an area proximate to the information display (202). When the selective call receiver (200) is retained in the holster (201) in a first orientation, a second portion (207) of the holster contiguously covers an opening in the housing where the information display (202) is positioned. The second portion (207) protects the information display by shunting energy from the impact into at least a front section (204) of the selective call receiver's housing and the holster (201).

9 Claims, 2 Drawing Sheets

SELECTIVE CALL RECEIVER HOLSTER WITH INTEGRAL DISPLAY IMPACT PROTECTION

This is a continuation of application Ser. No. 08/042,433 filed Apr. 5, 1993, abandoned.

FIELD OF THE INVENTION

This invention relates generally to selective call receiver holsters, and more particularly, to a selective call receiver holster that protects an information display integral to the selective call receiver.

BACKGROUND OF THE INVENTION

Reliability of operation is an important consideration for modern electronic devices, e.g., selective call receivers. One aspect of reliability is the device's ability to continue to function properly after being subjected to a mechanical impact such as incurred when the receiver is inadvertently dropped. Delicate components such as the liquid crystal information display (LCD) are particularly sensitive to mechanical shock since LCD's are fabricated from a "sandwich" of glass panels.

Various methods have been employed to protect LCD's from mechanical shock. Examples of conventional protection schemes are: situating the LCD in a physical location that minimizes direct contact with the impacting surface when the selective call receiver is dropped or suspending the LCD at its periphery in a shock absorbing frame within the selective call receiver. These alternatives improve protection but cannot protect the LCD in the event of a direct impact to the face of its assembly.

Accordingly, to alleviate the problems associated with LCD breakage due to direct mechanical shock, an apparatus must be fabricated that effectively isolates the LCD from a direct impact, thus eliminating the possibility of damaging or breaking the LCD and insuring continued reliable operation of the selective call receiver.

SUMMARY OF THE INVENTION

Briefly, according to the invention, there is provided a holster for retaining a selective call receiver. The selective call receiver is contained in a housing formed by joining at least a front and a rear section. The front section includes an opening in which an information display is positioned. The holster comprises a first portion residing in a first plane that is substantially adjacent to the rear section of the housing. A second portion of the holster is coupled to the first portion. The second portion extends from the first plane into a second plane substantially parallel to the first plane, and is positioned adjacent to the front section for contiguously covering the opening in which the information display is positioned when the selective call receiver is retained in the holster in a first orientation. The first and second portions contact respective rear and front sections of the housing to retain the selective call receiver in the holster. The second portion further serves to protect the information display from breakage due to an impact in an area proximate to the information display by shunting energy from the impact into at least the front section of the housing and the holster.

DESCRIPTION OF A PREFERRED EMBODIMENT

Figure 1:
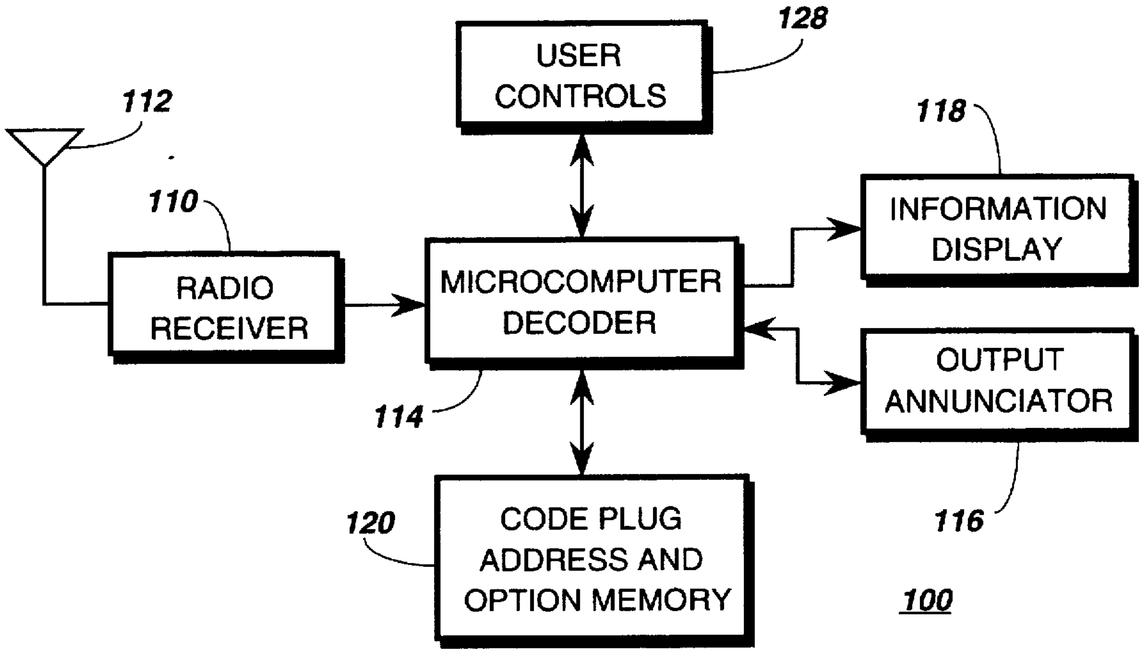
PRIOR ART FIG. 1
FIG. 1 is a block diagram of a paging receiver in accordance with the preferred embodiment of the present invention.

FIG. 1 is an electrical block diagram of a selective call receiver, e.g. a pager 100. It includes radio receiver circuitry 110 which receives signals via an antenna 112. The received signals include paging information. Selective call receivers can respond to transmitted information containing various combinations of tone, tone and voice, or data messages in a variety of modes. This information may be transmitted using several paging coding schemes and message formats.

The output of the radio receiver circuitry 110 is applied to a microcomputer decoder 114 which processes the information contained in the received signals, to decode any received message. As can be seen, the microcomputer decoder 114 communicates with an output annunciator 116, such as a transducer or speaker, to alert a user that a message has been received, with a display 118, such as a liquid crystal display (LCD), to present a message via the display 118, and with a code plug address and option memory 120 to retrieve predetermined address and function information. Normally, after a received address matches a predetermined address in the pager 100, the output annunciator 116 alerts the user that a message has been received. The user can activate user controls 128, such as buttons or switches, to invoke functions in the pager 100, and optionally to view the received message on the display 118. The operation of a paging receiver of the general type shown in FIG. 1 is well known and is more fully described in U.S. Pat. No. 4,518,961, issued May 21, 1985, entitled "Universal Paging Device with Power Conservation", which is assigned to the same assignee as the present invention and is incorporated herein by reference.

Figure 2:
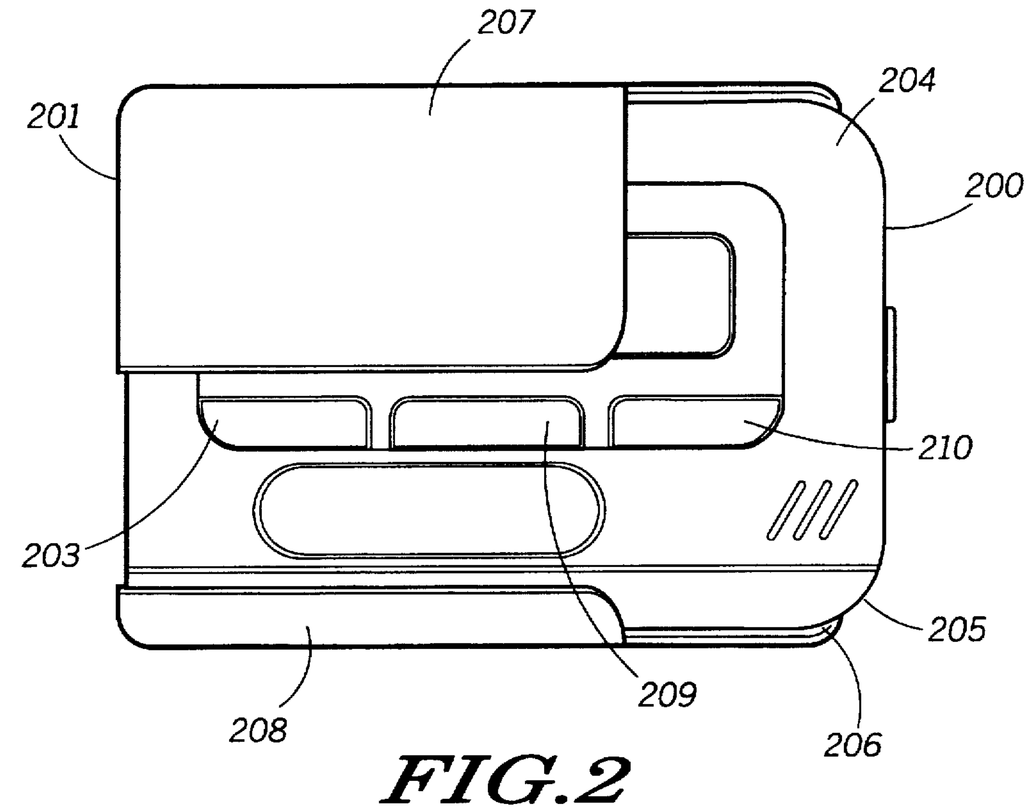
FIG. 2 illustrates the selective call receiver inserted in the protective holster in a first position that conceals and protects the selective call receiver's information display while exposing a message read activator and other operational controls in accordance with the preferred embodiment of the present invention.

FIG. 2 illustrates the selective call receiver 200 inserted in the protective holster 201 in a first position that conceals and protects the selective call receiver's information display 202 while exposing the message read activator 203 and other operational controls in accordance with the preferred embodiment of the present invention.

The holster 201 acts to retain a selective call receiver 200 that is contained in a housing formed by joining at least a front 204 and a rear 205 section. The front section 204 includes an opening in which an information display 202 is positioned. The holster comprises a first portion 206 residing in a first plane, the first plane being substantially adjacent to the rear 205 section of the housing; and a second portion 207 coupled to the first portion 206, the second portion extending from the first plane into a second plane substantially parallel to the first plane and positioned adjacent to the front section 204.

The second portion 207 contiguously covers the opening in which the information display 202 is positioned when the selective call receiver 200 is retained in the holster in a first orientation. The first 206 and second 207 portions contact respective rear 205 and front 204 sections of the housing to retain the selective call receiver 200 in the holster 201. Moreover, the second portion 207 serves to protect the information display 202 from breakage due to an impact in an area proximate to the information display (e.g., the second portion or the front section 204) by shunting energy from the impact into at least the front section 204 of the housing and the holster 201.

A third portion 208 is coupled to the first 206 portion and extends, on a side opposite to the coupling of the first 206 and second 207 portions, from the first plane into the second plane. The first 206 and third 208 portions contact respective rear 205 and front 204 sections of the housing for retaining the selective call receiver 200 in the holster 201.

Conventional selective call receiver's have little or no impact protection for their information display device(s). If a user accidentally drops their unit and the information display impacts an object, the display device (e.g., a liquid crystal display or the like) will most likely shatter. Attempts have been made to shock mount or isolate the display device from the energy transmitted by a mechanical shock, but these cannot effectively protect the information display from direct impact as can the instant invention. Consequently, discounting the instant invention, no practical solutions have been found that allow the user normal operation of their selective call receiver while affording protection for the information display.

Figure 3:
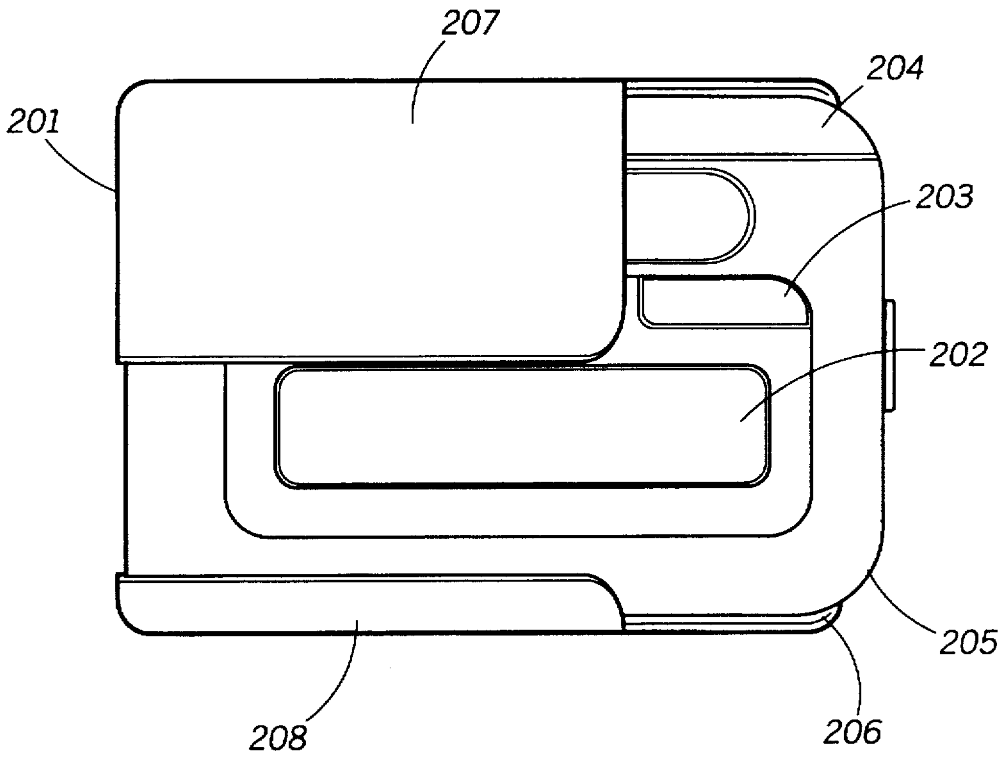
FIG. 3 illustrates a selective call receiver inserted in a protective holster in a second position that exposes the selective call receiver's information display while allowing access to the message read activator in accordance with the preferred embodiment of the present invention.

FIG. 3 illustrates a selective call receiver 200 inserted in a protective holster 201 in a second position that exposes the selective call receiver's information display 202 while allowing access to a message read activator 203 in accordance with the preferred embodiment of the present invention.

The selective call receiver 200 is retained in the holster 201 in a second position (orientation) where the selective call receiver 200 is rotated substantially 180 degrees with respect to an axis substantially perpendicular to the first and second planes. The second orientation exposes the information display 202 and a message read activator 203 while the second portion 207 covers at least one remaining function activator (shown as 209, 210 in FIG. 2) to prevent accidental execution of a operation associated with the at least one remaining function activator. This orientation allows normal use of the selective call receiver, that is, when the selective call receiver alerts a user, the user may interrogate the received message by executing the read function 203 and viewing an information message as presented on the information display 202.

FIGS. 2 and 3 effectively illustrate the enhanced utility of the instant invention over prior art selective call receiver/holster systems. In the prior art, the user could purchase an optional holster that allowed them to carry (usually via a belt clip or the like) the selective call receiver. As stated before, prior art holsters afforded no additional protection to the information display of the selective call receiver retained. Moreover, there was no provision for optionally protecting a portion of the operating controls as provided for in the instant invention. These features (increased, selectable display and operating control protection) provide the user not only with increased utility, but also function to protect their investment by improving reliability and decrease the chance of a system failure due to an inadvertent drop.

What is claimed is:

1. A holster for retaining a selective call receiver contained in a housing formed by joining at least a front section and a rear section, the front section including an opening in which an information display is positioned, the holster comprising:

a rear wall and a front shielding wall, the front shielding wall formed of rigid material suitable for shunting forces of an impact thereto;

the front shielding wall being attached to the rear wall and spaced therefrom and being substantially parallel to the rear wall, the holster suitable for retaining a selective call receiver therein for operation in either of first and second orientations between the rear wall and the front shielding wall which engage the front and rear sections, respectively, of the housing of the selective call receiver, the front section of the housing .engaging the front shielding wall in both the first and second orientations, and wherein the second orientation is such that the housing of the selective call receiver is rotated substantially 180 degrees from the first orientation with respect to an axis substantially perpendicular to the front section of the housing;

the front shielding wall being sized and shaped suitable for covering substantially only the information display of the selective call receiver when the selective call receiver is retained in the holster in the first orientation while not covering a remaining surface of the front section of the housing of the selective call receiver, and in the second orientation the front shielding wall exposing the information display of the selective call receiver.

2. The holster of claim 1, wherein the front shielding wall expose for access a plurality of function buttons on the front section of the housing of the selective call receiver when the selective call receiver is retained in the holster in the first orientation.

3. The holster of claim 2, wherein the front shielding wall exposes the information display of the selective call receiver when the selective call receiver is retained in the holster in the second orientation, and covers all but one of the plurality of function buttons when the selective call receiver is retained in the holster in the second orientation.

4. The holster of claim 1, and further comprising a retaining member attached to the rear wall for engaging the front section of the housing of the selective call receiver and retaining the selective call receiver in the holster.

5. A selective call receiver and holster combination, the selective call receiver contained in a housing comprising a front housing section and a rear housing section joined together, the front housing section having an aperture therein, the selective call receiver having an information display contained within the housing and exposed at the aperture of the front housing section, the holster comprising:

a rear wall and a front shielding, the front shielding wall formed of rigid material suitable for shunting forces of an impact thereto;

the front shielding wall being attached to the rear wall and spaced therefrom and being substantially parallel to the rear wall, the selective call receiver being retained in the holster suitable for operation in either of first and second orientations between the rear wall and the front shielding wall which engage the front and rear sections, respectively, of the housing of the selective call receiver;

the front section of the housing engaging the front shielding wall in both the first and second orientations, and wherein the second orientation is such that the housing of the selective call receiver is rotated substantially 180 degrees from the first orientation with respect to an axis substantially perpendicular to the front section of the housing;

the front shielding wall being sized and shaped for covering substantially only a portion of the front section of the housing of the selective call receiver corresponding to the information display of the selective call receiver when the selective call receiver is retained in the holster in the first orientation while not covering a remaining surface of the front section of the housing of the selective call receiver, and in the second orientation the front shielding wall exposing the information display of the selective call receiver.

6. The combination of claim 5, wherein the selective call receiver comprises a plurality of function buttons on the front section of the housing of the selective call receiver, and wherein the front shielding wall is shaped to expose the plurality of buttons for access when the selective call receiver is retained in the holster in the first orientation.

7. The combination of claim 8, wherein the front shielding wall is sized and shaped to expose the information display of the selective call receiver when the selective call receiver is retained in the holster in the second orientation, and to cover all but one of the plurality of function buttons by the front shielding wall when the selective call receiver is retained in the holster in the second orientation.

8. The combination of claim 7, wherein said one of the plurality of function buttons corresponds to a message read activator button to enable display of messages received by the selective call receiver.

9. The combination of claim 5, wherein the holster further comprises a retaining member attached to the rear wall for engaging the front section of the housing of the selective call receiver and retaining the selective call receiver in the holster.

* * * * *

UNITED STATES PATENT AND TRADEMARK OFFICE

CERTIFICATE OF CORRECTION

PATENT NO. : 5,537,678

DATED : July 16, 1996

INVENTOR(S) : King et al.

It is certified that error appears in the above-indentified patent and that said Letters Patent is hereby corrected as shown below:

Claim 1, column 4, line 14, change ".engaging" to --engaging--.

Claim 7, column 6, line 1, change "claim 8" to read --claim 5--.

Signed and Sealed this

Twelfth Day of November, 1996

Attest:

BRUCE LEHMAN

*Attesting Officer*

*Commissioner of Patents and Trademarks*